United States Patent
Vija et al.

(10) Patent No.: US 7,569,828 B2
(45) Date of Patent: Aug. 4, 2009

(54) APPLICATION-DRIVEN OPTIMIZATION OF ACQUISITION AND RECONSTRUCTION OF SPECT/PET PROJECTION DATA

(75) Inventors: A Hans Vija, Evanston, IL (US); Eric G. Hawman, Schaumburg, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 170 days.

(21) Appl. No.: 11/524,797

(22) Filed: Sep. 21, 2006

(65) Prior Publication Data

US 2008/0073538 A1    Mar. 27, 2008

(51) Int. Cl.
*G01T 1/166* (2006.01)

(52) U.S. Cl. .................................. 250/363.04

(58) Field of Classification Search ............ 250/363.04; 378/65
See application file for complete search history.

(56) References Cited

U.S. PATENT DOCUMENTS 4,352,018 A * 9/1982 Tanaka et al. .......... 250/363.03
2002/0181645 A1 * 12/2002 Bruder et al. .................. 378/8

* cited by examiner

Primary Examiner—David P Porta
Assistant Examiner—Mark R Gaworecki

(57) ABSTRACT

A method for optimizing imaging dwell time during nuclear imaging. A fast pre-scan is conducted over the angular range of imaging, with equal dwell time at each position. A statistical sub-sampling is conducted over a region of interest to a desired fraction of the acquisition time. The statistical sub-sampling is used to simulate a varying dwell time tomographic dataset according to a profile pre-generated by an analysis of patient specific anatomic or functional information. Reconstructed data with equal dwell time and with simulated adaptive dwell time are constructed and compared to generate a difference image, a parameter of interest of which is evaluated. If the parameter of interest is within an acceptable level, the reduced dwell time for the given angular position is established; otherwise, the fraction is varied and the process is repeated. Once dwell times are computed for all view angles, a full scan is conducted.

18 Claims, 3 Drawing Sheets

APPLICATION-DRIVEN OPTIMIZATION OF ACQUISITION AND RECONSTRUCTION OF SPECT/PET PROJECTION DATA

FIELD OF THE INVENTION

The invention generally relates to nuclear medicine. More particularly, it relates to nuclear tomographic imaging—particularly SPECT (single photon emission computed tomography) or PET (positron emission tomography) scanning—in which an imaging detector (e.g., a scintillation camera) rotates around the patient to obtain a plurality of data acquisitions, which are subsequently processed to reconstruct tomographic "slice" images of the patient.

BACKGROUND OF THE INVENTION

In a conventional SPECT study of an organ such as the heart, a radioisotope (Tc-99m, Tl-201, for example) is administered to the patient and the radioisotope is taken up by the organ. Then, the patient is placed in a scintillation camera system and one or more scintillation camera detectors are incrementally rotated about the long axis of the patient, acquiring projection data at each of a number of angular positions or "views" with respect to the patient's body. The detectors acquire project data through interaction with gamma photons which emanate from the patient, and the resulting projection data from each view are processed to obtain image reconstruction data, which reconstruction data forms three-dimensional images (e.g., "SPECT images" or "tomographic images") of the distribution of the radioisotope within the patient, and thereby of the internal organs and/or biological functions of the patient, such as blood flow.

According to current protocol (e.g. DICOM), the length of time that a scintillation detector remains at any given angular position relative to the patient ("dwell time") is constant throughout a given scan. That is, a user may specify only a single scan speed or dwell time, which determines the time that a detector remains at a specific view angle acquiring "counts" or gamma absorption events in the detector, which are subsequently used in image reconstruction.

However, because of attenuation and finite collimator resolution, the projection image information content can vary significantly from view to view, i.e., from one projection angle to the next. For instance, the attenuation parameters of the patient's tissues may vary depending upon the angle from which they are viewed, which means that gamma photons emanating from one particular view angle have an effective count rate that is different from the effective count rate at another view angle. Further, finite collimator resolution means that increases in clinically significant image resolution may be asymptotic as a function of time. For example, as shown in FIG. 1, for a region of interest (ROI) 101 of a patient 102, for a given dwell time $d_t$, the number of counts N1 acquired at view angle $\theta$ is greater than the number of counts N2 obtained at view angle $\theta+\pi$.

Therefore, the dwell time at each angle may be either longer or shorter than is necessary or appropriate to gather sufficient projection data to generate the PET or SPECT image, depending upon the characteristics of the particular ROI being imaged at the particular view angle. Under the existing protocols, this means that image quality may suffer because only a single scan speed or dwell time is specified. For example, insufficient projection data may be acquired at certain view angles because the given dwell time is too short for the attenuation characteristics associated with that angle, while scan time may be wasted at other view angles because additional projection data acquired after resolution limits have been reached.

In various clinical or research applications, there may be restrictions on the amount of time available to conduct an image study. Accordingly, improvement in the efficient use of available study time may also enable the overall acquisition time to be shortened, thereby allowing an increase in patient throughput for clinical studies.

SUMMARY OF THE INVENTION

According to the present invention, the scan speed or dwell time of a nuclear imaging apparatus may be varied from one angular position or view to the next throughout the course of a tomographic imaging study. This utilizes available study time more efficiently or shortens the overall required acquisition time without compromising image quality.

The different dwell times per view can be chosen so as to optimize various measures of image quality, such as optimizing the total image noise power, optimizing the probability of detecting lesions, optimization of image quality for multi-modality imaging applications (such as combined CT/SPECT, MRI/SPECT, CT/PET etc.), optimization of image quality for perfusion studies, optimization of object contrast in the ROI, etc.

According to one aspect of the invention, scan speed or dwell time is determined adaptively based on data acquired in an initial "fast" pre-scan. A statistical sub-sampling is conducted over a region of interest to generate a simulated dataset. The simulated dataset is then reconstructed twice—once using equal dwell time values (total scan time divided by the number of views taken) and once using an adaptive dwell time value (a fractional level of the equal dwell time values)—to generate a pair of image sets. The image sets are used to create a difference image, based on which an objective value based on a parameter of interest is computed. If the objective value is within a permissible level, the fractional dwell time for the given view angle is established; otherwise, the adaptive dwell time (i.e., the fraction of the equal-value dwell time) is varied and the sub-process is repeated either until the objective value has been brought to an acceptable level or until a maximum number of permissible iterations has been reached. Once a dwell time value has been determined in this manner for each view angle, a full scan is conducted.

According to another aspect of the invention, the dwell time for a detector at each projection angle is varied in a manner that minimizes noise power in the reconstructed image.

BRIEF DESCRIPTION OF THE DRAWINGS

The invention will now be described in greater detail in connection with the associated drawings, in which.

DETAILED DESCRIPTION OF EMBODIMENTS OF THE INVENTION

Figure 1:
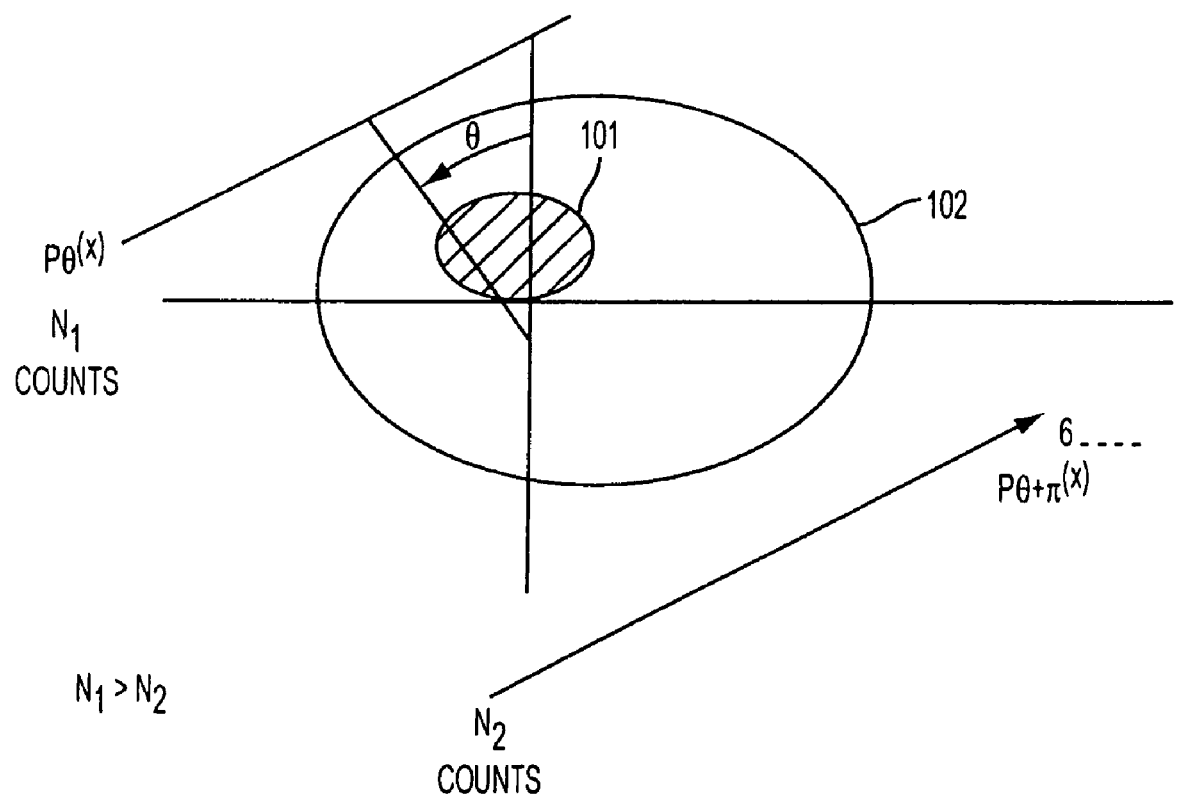
FIG. 1 is a diagram illustrating the difference in projection data content for a given dwell time, depending on the view angle or position of a detector with respect to a region of interest of a patient.
Figure 2:
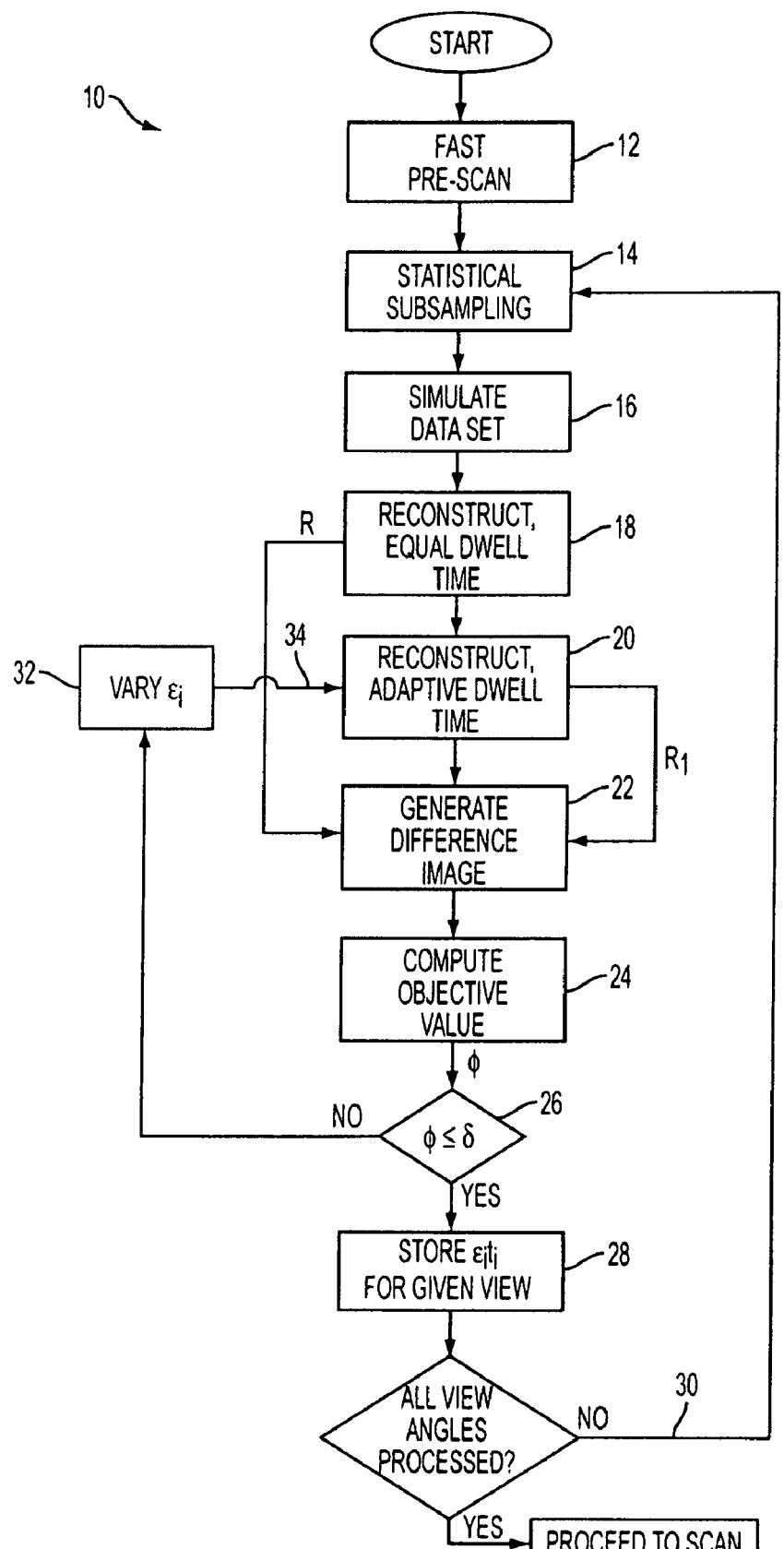
FIG. 2 is a flowchart illustrating one possible method for calculating adaptive dwell times in accordance with the invention.

An embodiment 10 of one method in accordance with the concepts of the invention is illustrated in FIG. 2. According to this method, an initial "fast" pre-scan 12 is first conducted for total time T to accumulate statistical projection data. The fast pre-scan is conducted over a defined ROI in the projection image. The ROI may be defined automatically, such as through the use of various known methods such as automatic segmentation methods in heart studies. The ROI also may be defined semi-automatically, such as having a user define an ROI in one projection view, from which a software program can infer ROIs in all other projection views. Alternatively, the ROI may be identified manually by the user in each projection view.

During this initial pre-scan, the dwell time $t_i$ per angular view is held constant over the entire scan range (either $\pi$ or $2\pi$ radians, depending on the type of scan being conducted) such that:

$$T = \Sigma t_i, i=1, \ldots N, N = \text{number of views}, t = t_i, \forall i.$$

For each pixel in the ROI, an analysis of the number of counts acquired for the pixel is analyzed, such that the number of counts per pixel as well as the total counts over the entire ROI may be determined. Once the pre-scan is complete, at step 14 a statistical subsampling for a time $T_1$, which is a desired fraction $\epsilon$ of the total pre-scan acquisition time T is performed on the acquired pre-scan data, wherein $T_1 = \epsilon T$, $\epsilon \leq 1$.

Next, at step 16 the statistical subsampling is used to simulate a varying dwell time tomographic dataset according to a profile that has been pre-generated for the patient by an analysis of patient-specific anatomical dataset (e.g., μ-map from a CT scan) or a functional reconstructed dataset (e.g., from the pre-scan); alternatively, time increments may be assumed to be equal $(t^1_i = t^1)$ such that $t^1_i = \epsilon_i t_1 \leq t_i$, and $T_1 = \Sigma t^1_i$.

Next, at step 18, the pre-scan acquired data is reconstructed to obtain a reconstructed image R, being based on the pre-scan using constant dwell time and at step 20 a second reconstructed image $R_1$ is obtained from the statistically subsampled dataset obtained at step 16. Next, at step 22 a difference image $(R - R_1)$ is generated. Once the difference image is generated, at step 24 an objective value $\Phi$ is computed based on some measure of image quality (e.g., $L_2$), such that $\Phi = \text{minarg} \| (R - R_1)^2 \|$.

It should be appreciated that in accordance with the invention, dwell time can be varied so as to optimize a variety of different image quality parameters, e.g., total image noise power, the probability of lesion detection, etc., and $\Phi$ will vary accordingly.

Once $\Phi$ has been calculated, at step 26 it is compared to a pre-selected, acceptable level of deviation $\delta$. If $\Phi \leq \delta$ (or if a pre-selected maximum number of iterations has been reached), then $\epsilon_i$ for the given view angle, and hence the reduced dwell time $\epsilon_i t_i^1$ for the given view angle, has been determined. This reduced dwell time value for the given view angle is stored at step 28 and at step 30 the overall process repeats itself for the next view angle until all view angles have been analyzed. Otherwise, if $\Phi > \delta$, $\epsilon_i$ is varied at step 32 to a modified dwell time $\epsilon_i + \Delta\epsilon$ and the sub-process repeats at step 34, to obtain a new statistical subsampling of the pre-scan data with the modified dwell time $(\epsilon_i + \Delta\epsilon) t_i^1$, and an updated or revised image set $R_1$ is reconstructed at step 20.

Alternatively, if $\Phi \leq \delta$ is determined to be true at step 26, the dwell time fraction $\epsilon_i$ may be reduced by a predetermined increment, and the statistical subsampling recalculated, to determine whether the dwell time can be even further reduced while still maintaining the objective measure of image quality $\Phi$ with the acceptable deviation range $\delta$. As a further alternative, it is possible to use variable dwell times for different view angles in the pre-scan instead of a constant dwell time. In this case, the individual modifications to the dwell times as a function of view angle would simply be different than if a constant dwell time over all view angles were to be used.

Once all view angles have been processed in this manner such that a specific dwell time for each angle has been determined, a full scan is conducted using the dwell times calculated for each view angle.

According to another method to determine dwell time so as to minimize noise power, it can be shown that for an imaging acquisition of time T, the total noise power in a reconstructed image for a particular view angle can be minimized by making the dwell time $t_i$ for that view angle proportional to the square root of the count rate $r_i$ at that angle:

$$t_i = \frac{\sqrt{r_i}}{\sum \sqrt{r_i}} T.$$

Figure 3:
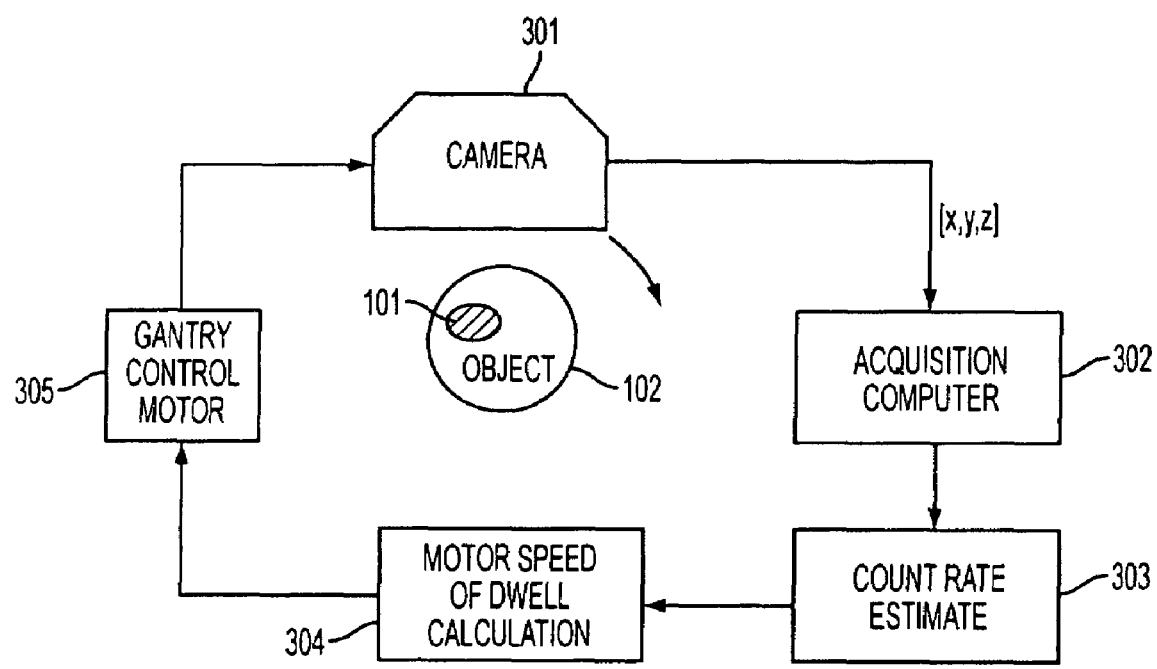
FIG. 3 is a block diagram of a system for implementing the invention.

FIG. 3 shows an example system which may be used to implement the concepts of the present invention. Camera detector 301 is orbitally positioned about ROI 101 of patient or object 102, and acquires projection data for a particular dwell time. The motion of camera 301 is controlled, for example, by gantry control motor 305. The (x, y, z) projection data (i.e., spatial coordinates and total energy) is inputted to acquisition computer 302. The data is supplied to a dwell time calculator, such as count rate estimator 303, which determines the dwell time for the view angle based on a dwell time calculation method such as that shown in FIG. 2 or explained above with respect to the total noise power. The calculated dwell time is inputted to a unit 304, which determines the speed of the gantry motor based on the calculated dwell time, and sends a control signal to the gantry motor control unit 305 to control the gantry motor accordingly.

It should be appreciated by those having ordinary skill in the art that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

We claim:

1. A nuclear medicine tomographic imaging apparatus, comprising:
    a detector capable of orbiting about a patient to acquire projection data at a plurality of view angles;
    a control unit that varies the amount of time that said detector remains at a particular view angle in response to a control signal; and
    a processing unit that develops said control signal in response to a desired measure of image quality wherein to develop said control signal said processing unit is adapted to perform a pre-scan of said patient for a plurality of view angles over a period of time shorter than a time required for a clinical scan, and obtain pre-scan data;

subsample said pre-scan data with a varied dwell time to obtain simulated varied dwell time data;

compare a reconstructed image of said pre-scan data with a reconstructed image of said simulated varied dwell time data;

determine whether the result of said comparison falls within a predefined acceptable range;

modify said varied dwell time to obtain a modified set of simulated varied dwell time data if the result of said comparison is outside of said predefined acceptable range; and use said varied dwell time in a clinical scan of said patient if the result of said comparison is within said predefined acceptable range.

2. The imaging apparatus of claim 1, wherein said desired measure of image quality is inputted by a user.

3. The imaging apparatus of claim 1, wherein said control signal is developed based on at least one data acquisition parameter associated with said patient.

4. The imaging apparatus of claim 1, wherein said desired measure of image quality is minimized total noise power.

5. The imaging apparatus of claim 1, wherein said desired measure of image quality is maximization of probability of lesion detection.

6. The imaging apparatus of claim 1, wherein said desired measure of image quality is optimization of object contrast in a region of interest.

7. The imaging apparatus of claim 1, wherein said desired measure of image quality is optimization of image quality for multi-modality imaging.

8. The imaging apparatus of claim 1, wherein said comparison involves calculating a difference between the reconstructed image of said pre-scan data and the reconstructed image of said simulated varied dwell time data.

9. The imaging apparatus of claim 1, wherein said pre-scan uses a constant dwell time for each view angle.

10. The imaging apparatus of claim 1, wherein said predefined acceptable range is based on said desired measure of image quality.

11. A method of calculating variable dwell times for particular view angles of a nuclear medicine imaging detector with respect to a patient, comprising the steps of:

performing a pre-scan of said patient for a plurality of view angles over a period of time shorter than a time required for a clinical scan, and obtaining pre-scan data;

subsampling said pre-scan data with a varied dwell time to obtain simulated varied dwell time data;

comparing a reconstructed image of said pre-scan data with a reconstructed image of said simulated varied dwell time data;

determining whether the result of said comparison falls within a predefined acceptable range;

modifying said varied dwell time to obtain a modified set of simulated varied dwell time data if the result of said comparison is outside of said predefined acceptable range; and using said varied dwell time in a clinical scan of said patient if the result of said comparison is within said predefined acceptable range.

12. The method of claim 11, wherein said comparison involves calculating a difference between the reconstructed image of said pre-scan data and the reconstructed image of said simulated varied dwell time data.

13. The method of claim 11, wherein said pre-scan uses a constant dwell time for each view angle.

14. The method of claim 11, wherein said predefined acceptable range is based on a desired measure of image quality specified by a user.

15. The method of claim 14, wherein said desired measure of image quality is minimized total noise power.

16. The method of claim 14, wherein said desired measure of image quality is maximization of probability of lesion detection.

17. The method of claim 14, wherein said desired measure of image quality is optimization of object contrast in a region of interest.

18. The method of claim 14, wherein said desired measure of image quality is optimization of image quality for multi-modality imaging.

* * * * *